US010546241B2

(12) United States Patent
Yang et al.

(10) Patent No.: US 10,546,241 B2
(45) Date of Patent: Jan. 28, 2020

(54) SYSTEM AND METHOD FOR ANALYZING A ROOT CAUSE OF ANOMALOUS BEHAVIOR USING HYPOTHESIS TESTING

(71) Applicant: Futurewei Technologies, Inc., Plano, TX (US)

(72) Inventors: Kai Yang, Bridgewater, NJ (US); Sijia Liu, Syracuse, NY (US)

(73) Assignee: Futurewei Technologies, Inc., Plano, TX (US)

( * ) Notice: Subject to any disclaimer, the term of this patent is extended or adjusted under 35 U.S.C. 154(b) by 1007 days.

(21) Appl. No.: 14/991,685

(22) Filed: Jan. 8, 2016

(65) Prior Publication Data

US 2017/0200088 A1    Jul. 13, 2017

(51) Int. Cl.
*G06N 5/04* (2006.01)
*G06N 7/00* (2006.01)
(Continued)

(52) U.S. Cl.
CPC ............ *G06N 7/005* (2013.01); *G06F 11/00* (2013.01); *H04W 24/04* (2013.01); *G06N 5/04* (2013.01); *H04W 24/10* (2013.01)

(58) Field of Classification Search
None
See application file for complete search history.

(56) References Cited

U.S. PATENT DOCUMENTS 6,278,997 B1    8/2001   Agrawal et al.
6,651,049 B1   11/2003   Agrawal et al.
(Continued)

FOREIGN PATENT DOCUMENTS

CN    101189895 A    5/2008
CN    101527895 A    9/2009
(Continued)

OTHER PUBLICATIONS

Vaser, et al., QoS KPI and QoE KQI relationship for LTE Video Streaming and VoLTE Services, 9th International Conference on Next Generation Mobile Applications, Services and Technologies, (2015) pp. 318-323 (Year: 2015).*

(Continued)

*Primary Examiner* — Wilbert L Starks
(74) *Attorney, Agent, or Firm* — Vierra Magen Marcus LLP

(57) ABSTRACT

The disclosure relates to technology for identifying a root cause of anomalous behavior in a communications network. A key quality indicator (KQI) indicative of a performance level associated with a source is received in the communication network. The KQI includes a performance measurement value to identify a performance level of the source having the anomalous behavior. An improved KQI indicative of a level of degradation is calculated based on the anomalous behavior at the source by recovering the KQI to a historical value. Sources of the anomalous behavior are clustered into subsets according to the level of degradation based on the calculated KQI improvement. A global or partial degradation type of the root cause source in the subset having a severe level of degradation is determined using hypothesis testing, and a confidence value is provided for the accepted degradation type.

25 Claims, 11 Drawing Sheets

(51) Int. Cl.
*G06F 11/00* (2006.01)
*H04W 24/04* (2009.01)
*H04W 24/10* (2009.01)

(56) References Cited

U.S. PATENT DOCUMENTS

| | | |
|---|---|---|
| 8,775,341 B1 | 7/2014 | Commons |
| 9,152,918 B1 | 10/2015 | McNair |
| 9,258,200 B2 | 2/2016 | Wan et al. |
| 9,424,121 B2 | 8/2016 | Kushnir et al. |
| 9,542,532 B1 | 1/2017 | McNair et al. |
| 2002/0022952 A1 | 2/2002 | Zager et al. |
| 2003/0130991 A1 | 7/2003 | Reijerse et al. |
| 2006/0242035 A1 | 10/2006 | Corbett et al. |
| 2007/0263539 A1 | 11/2007 | Lonnqvist et al. |
| 2009/0024551 A1 | 1/2009 | Agrawal et al. |
| 2009/0052330 A1 | 2/2009 | Matsunaga et al. |
| 2009/0165078 A1 | 6/2009 | Samudrala et al. |
| 2009/0192867 A1 | 7/2009 | Farooq et al. |
| 2013/0272150 A1 | 10/2013 | Wan et al. |
| 2015/0004964 A1 | 1/2015 | Tontinuttananon et al. |
| 2015/0033086 A1 | 1/2015 | Sasturkar et al. |
| 2015/0049634 A1 | 2/2015 | Levchuk et al. |
| 2015/0074035 A1 | 3/2015 | Narasappa |
| 2015/0134622 A1 | 5/2015 | Ebel et al. |
| 2016/0105801 A1 | 4/2016 | Wittenberg et al. |
| 2016/0162346 A1 | 6/2016 | Kushnir et al. |
| 2016/0292611 A1 | 10/2016 | Boe et al. |
| 2016/0344606 A1 | 11/2016 | Baccarani |
| 2016/0350173 A1 | 12/2016 | Ahad |

FOREIGN PATENT DOCUMENTS

| | | |
|---|---|---|
| CN | 102081623 A | 6/2011 |
| CN | 102143507 A | 8/2011 |
| CN | 103024793 A | 4/2013 |
| CN | 103812671 A | 5/2014 |
| CN | 103945442 A | 7/2014 |
| CN | 104571099 A | 4/2015 |
| CN | 105050125 A | 11/2015 |
| EP | 2919416 B1 | 9/2015 |
| WO | 2016093836 A1 | 6/2016 |

OTHER PUBLICATIONS

PCT/CN2017/070301, ISR, Mar. 28, 2017.
U.S. Appl. No. 15/476,584, filed Mar. 31, 2017.
U.S. Appl. No. 15/186,346, filed Jun. 17, 2016.
Notice of Allowance dated Feb. 12, 2019 in U.S. Appl. No. 15/069,617.
Response to Office Action filed Apr. 1, 2019 in U.S. Appl. No. 15/186,346.
Response to Office Action filed Apr. 9, 2019 in U.S. Appl. No. 15/476,584.
Office Action dated Jun. 25, 2019 in U.S. Appl. No. 15/186,346.
Notice of Allowance dated Jul. 11, 2019 in U.S. Appl. No. 15/476,584.
Response to Office Action filed Dec. 17, 2018, in U.S. Appl. No. 15/069,617.
Office Action dated Jan. 2, 2019, in U.S. Appl. No. 15/186,346.
Office Action dated Jan. 11, 2019, in U.S. Appl. No. 15/476,584.
English Abstract of CN102143507 dated Aug. 3, 2011.
Office Action dated Aug. 16, 2018, in U.S. Appl. No. 15/069,617.
Batteram, Harold, et al. "Delivering quality of experience in multimedia networks," Bell Labs Technical Journal 1.1 2010): pp. 175-193, 2010.
Ciocarlie, Gabriela F. et al.,"Detecting Anomalies in Cellular Networks Using an Ensemble Method", IEEE, Oct. 18, 2013,total 4 pages.
Asghar, Muhammad Zeeshan et al.,"Cell Degradation Detection based on an Inter-Cell Approach", Dec. 13, 2016, total 9 pages.
Toube, Hideki et al., "Problems and feasibility consideration of Service-forcused Monitoring OSS over mobile networks", Network Development Department NTT DOCOMO, Inc., 4 pages.
European search report dated Aug. 27, 2018, in European Patent Application No. 17735838.9, 13 pages.
PCT/CN2017/075362, ISR, Jun. 2, 2017.
Yu Yan-hua et al, a Dynamic Compuation Approach to Determining the Threshold in Network Anomaly Detection. Journal of Beijing University of Posts and Telecommunications, vol. 34, No. 2, Apr. 2011, 5 pages.
Office Action dated Nov. 4, 2019, in Chinese Patent Application No. 201780005633.3, 30 pages.

* cited by examiner

SYSTEM AND METHOD FOR ANALYZING A ROOT CAUSE OF ANOMALOUS BEHAVIOR USING HYPOTHESIS TESTING

BACKGROUND

Service quality as perceived by customers is an important aspect of the telecommunications industry. To successfully maintain and enhance the service quality to customers, network behaviors require measurement and analysis. However, measuring and improving a customer's quality of service experience remains a challenging task, which requires accounting for technical issues, such as response times and throughput, and non-technical issues, such as customer expectations, prices and customer support. One mechanism to measure these issues is by root cause analysis for network troubleshooting in a communication network. For example, a customer service assurance platform may be used to analyze performance and quality degradation from a variety of network services, such as content servers and user devices, to ensure customer service quality is consistent with communication service provider expectations.

Another mechanism to troubleshoot communication networks involves use of Key Performance Indicators (KPIs) and Key Quality Indicators (KQIs). KQIs and KPIs are typically measured in an effort to determine various performance levels of the network services such that an operator may detect any deterioration (degradation) of service levels as well as to identify the cause(s) associated with the deterioration in service level. For example, a user's device may experience poor coverage or fail to handover due to a faulty base station or a content server may suffer from a hardware issue resulting in performance degradation. However, such detection and analysis does not consistently define a correlation between network anomalies and customer perception. For example, network KPIs may suffer from the effects of a small number of degraded samples, such as a small number of network devices or servers, being analyzed for which the samples are used during various KPI calculations. As a result, network performance levels may be identified as problematic when in fact the issues are merely related to a relatively small number of degraded samples which are not reflective of the network.

BRIEF SUMMARY

In one embodiment, there is a method for identifying a root cause of anomalous behavior in a communications network, including receiving a key quality indicator (KQI) indicative of a performance level associated with a source in the communication network, the KQI including a performance measurement value identifying the performance level of the source having the anomalous behavior; calculating an improved KQI indicative of a level of degradation resulting from the anomalous behavior at the source by recovering a current performance measurement value at the source to a baseline performance measurement value at the source; grouping the source into at least one of a first subset of sources and a second subset of sources according to the level of degradation at the source based on the calculated improved KQI; and determining a degradation type for the source grouped in the second subset based on execution of a statistical hypothesis test and computing a confidence value indicative of a confidence level in accepting the determined degradation type as a result of the statistical hypothesis test.

In another embodiment, there is an apparatus for identifying a root cause of anomalous behavior in a communications network, including a receiver receiving a key quality indicator (KQI) indicative of a performance level associated with a source in the communication network, the KQI including a performance measurement value identifying the performance level of the source having the anomalous behavior; and a processor configured to calculate an improved KQI indicative of a level of degradation resulting from the anomalous behavior at the source by recovering a current performance measurement value at the source to a baseline performance measurement value at the source; group the source into at least one of a first subset of sources and a second subset of sources according to the level of degradation at the source based on the calculated improved KQI; and determine a degradation type for the source grouped in the second subset based on execution of a statistical hypothesis test and compute a confidence value indicative of a confidence level in accepting the determined degradation type as a result of the statistical hypothesis test.

In still another embodiment, there is a computer-readable storage device comprising instructions which cause one or more processors to execute a method of identifying a root cause of anomalous behavior in a communications network, the method including receiving a key quality indicator (KQI) indicative of a performance level associated with a source in the communication network, the KQI including a performance measurement value identifying the performance level of the source having the anomalous behavior; calculating an improved KQI indicative of a level of degradation resulting from the anomalous behavior at the source by recovering a current performance measurement value at the source to a baseline performance measurement value at the source; grouping the source into at least one of a first subset of sources and a second subset of sources according to the level of degradation at the source based on the calculated improved KQI; and determining a degradation type for the source grouped in the second subset based on execution of a statistical hypothesis test and computing a confidence value indicative of a confidence level in accepting the determined degradation type as a result of the statistical hypothesis test.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The disclosure relates to technology for identifying a root cause of anomalous behavior in a communications network using hypothesis testing. When an anomalous behavior affects the performance level of the network, the system identifies the source causing the anomalous behavior, along with a probability (level of confidence) that the source is in fact the root cause. Identifying the anomalous behavior at the source is performed using a KQI projection from the source level to the Radio Network Controller (RNC) level, in which a performance metric (termed a KQI improvement or improved KQI) is utilized to measure the anomalous effect on each source. The improved KQI provides a measurement of the improvement of the system when the KQI value of a degraded source (the source with the anomalous behavior) is recovered to a historical (baseline) KQI value. In this regard, a learned processing mechanism is used to identify a subset of the sources having severe KQI degradation, and a hypothesis testing problem is formulated for determining the degradation type at the source and solved using a heuristic method or a Student's T-test.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
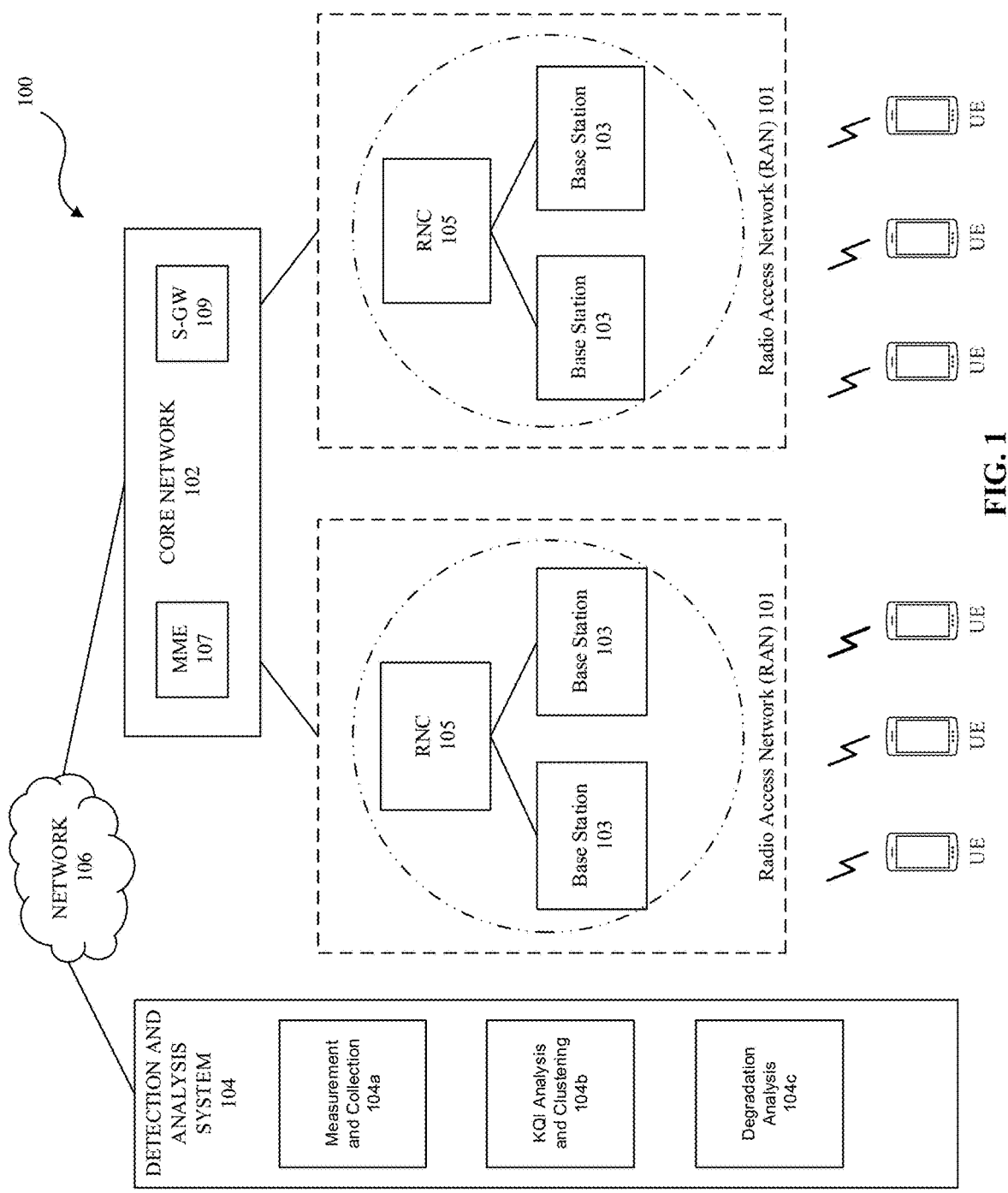
FIG. 1 illustrates a communication system in accordance with one embodiment.

FIG. 1 illustrates a communication system on which the disclosed embodiments may be implemented. The communication system 100 may be a cellular mobile communication system (or cellular radio communication network) including a Radio Access Network (RAN) 101, such as an E-UTRAN, Evolved UMTS Terrestrial Radio Access Network according to LTE (Long Term Evolution)), a core network 102, such as an EPC according LTE, a detection and analysis system 104, and a network 106, such as the Internet. The RAN 101 may include base stations 103, such as base transceiver stations, eNodeBs, eNBs, home base stations, Home eNodeBs, HeNBs according to LTE, or LTE-Advanced. Each base station 103 may provide radio coverage for one or more mobile radio cells of the radio access network 101. Thus, the base stations 103 of the radio access network 101 may span different types of cells, such as macro cells, femto cells, pico cells, small cells, open cells, closed subscriber group cells, hybrid cells, for instance according to LTE, or LTE-Advanced. Additionally, the RAN 101 includes RNC 105 that governs elements in the RAN 101 and is responsible for controlling the the base stations 103 connected thereto.

User Equipment (UE), such as a mobile terminal, connects to a RAN 101 and may communicate with the core network 102 and with other user equipment UE via the base stations 103 to provide coverage in the network. For example, the base station 103 operating a particular radio cell (not shown) in which the user equipment UE is located may provide the E-UTRA user plane terminations including the Packet Data Convergence Protocol (PDCP) layer, the Radio Link Control (RLC)) layer and the Medium Access Control (MAC) layer and control plane terminations including the Radio Resource Control (RRC) layer towards the user equipment UE.

The base stations 103 may be interconnected with each other using an interface (not shown), such as an X2 interface, and connected to core network 102 via another interface (not shown), such as an S1 interface, to a Mobility Management Entity (MME) 107 and a Serving Gateway (S-GW) 109. It is also appreciated that a base station 103 may be connected to more than one MME/S-GW 107, 109 and an MME/S-GW 107, 109 may be connected to more than one base station 103 to enable, for example, network sharing in LTE. Moreover, the MME 107 may be responsible for controlling the mobility of the user equipment UE located in the coverage area of E-UTRAN, while the S-GW 109 may be responsible for handling the transmission of user data between user equipment UE and the core network 102.

Each base station 103 of the communication system 100 may control communications within its geographic coverage area (or cell that defines the geographic coverage area). When the user equipment UE is located within its geographic coverage area, the user equipment UE communicates with the base station 103 controlling the geographic coverage area. When a call is initiated by the user of the user equipment UE or a call is addressed to the user equipment UE, radio channels are set up between the user equipment UE and the base station 103 controlling the geographic coverage area in which the user equipment UE is located. If the user equipment UE moves away from the geographic coverage area in which a call was set up and the signal strength of the radio channels established in the geographic coverage area weakens, the communication system may initiate a transfer of the call to radio channels of another geographic coverage area into which the user equipment UE moves. As the user equipment UE continues to move throughout the coverage area of the communication system 100, control of the call may be transferred between neighboring geographic coverage areas or cells.

It is appreciated that the disclosed communication system is a non-limiting example, and that any number of different network components, services and devices may be employed as well understood in the art. For example, the depicted communication system is not limited to two RANs, and the RANs are not limited to two base stations and a single RNC. Any number of RANs, base stations and RNCs may be employed. Similarly, any number of different types of RANs, Core Networks and Networks may be employed depending on the type of network.

The communications system 100 also includes a detection and analysis system 104, including a measurement and collection module 104a, a KQI analysis and clustering module 104b and a degradation analysis module 104c. Although the detection and analysis system 104 is depicted as separate from the RAN 101 and core network 102, it may also be included within the RAN 101 (or the base station 103 or RNC 105) or core network 102, either in part or whole. For example, the RNC 105 may provide the functionality of measuring and collecting KQI data, analyzing and clustering the KQI data and/or performing degradation analysis.

Using the measurement and collection module 104a, network statistics can be collected from RAN 101. The network statistics may be retrieved from an operation and support system of the RAN 101, or from any other network element (such as a Server) or any intermediate element storing the requested data, performance statistics, or configuration parameters. Key quality indicators (KQIs) of the RAN 101 may be measured and collected for a pre-defined measurement period, and multiple measurement periods may be aggregated for detecting coverage and call quality issues (i.e., anomalous behavior).

For example, KQIs to be collected may be related to service coverage. The coverage level KQI may be measured, for example, using a statistic for counting a number of events where radio conditions drop below a certain quality threshold. For example, some radio resource management (RRM) procedures may be triggered by drops in quality thresholds for certain radio conditions. Another example of KQIs to be collected include excessive propagation delay, which may be measured using propagation delay counters. It is appreciated that numerous other KQI may be measured and collected, and those detailed in the embodiments above are non-limiting.

The KQI analysis and clustering module 104b may be responsible for analyzing the collected KQI data and grouping the data into various clusters or subsets of information. For example the analysis may include computing differences and degradation levels between KQI values, or using recovery techniques to eliminate anomalous behaviors in the system. Various metrics, as explained below, may be employed to compute these values. Moreover, the KQI analysis and clustering module 104b may group the analyzed data into clusters or subsets based on a learning process mechanism, as detailed below.

The Degradation Analysis module 104c may be employed to detect root causes of the anomalous behavior using hypothesis testing, features of which are described below in detail.

Figure 2:
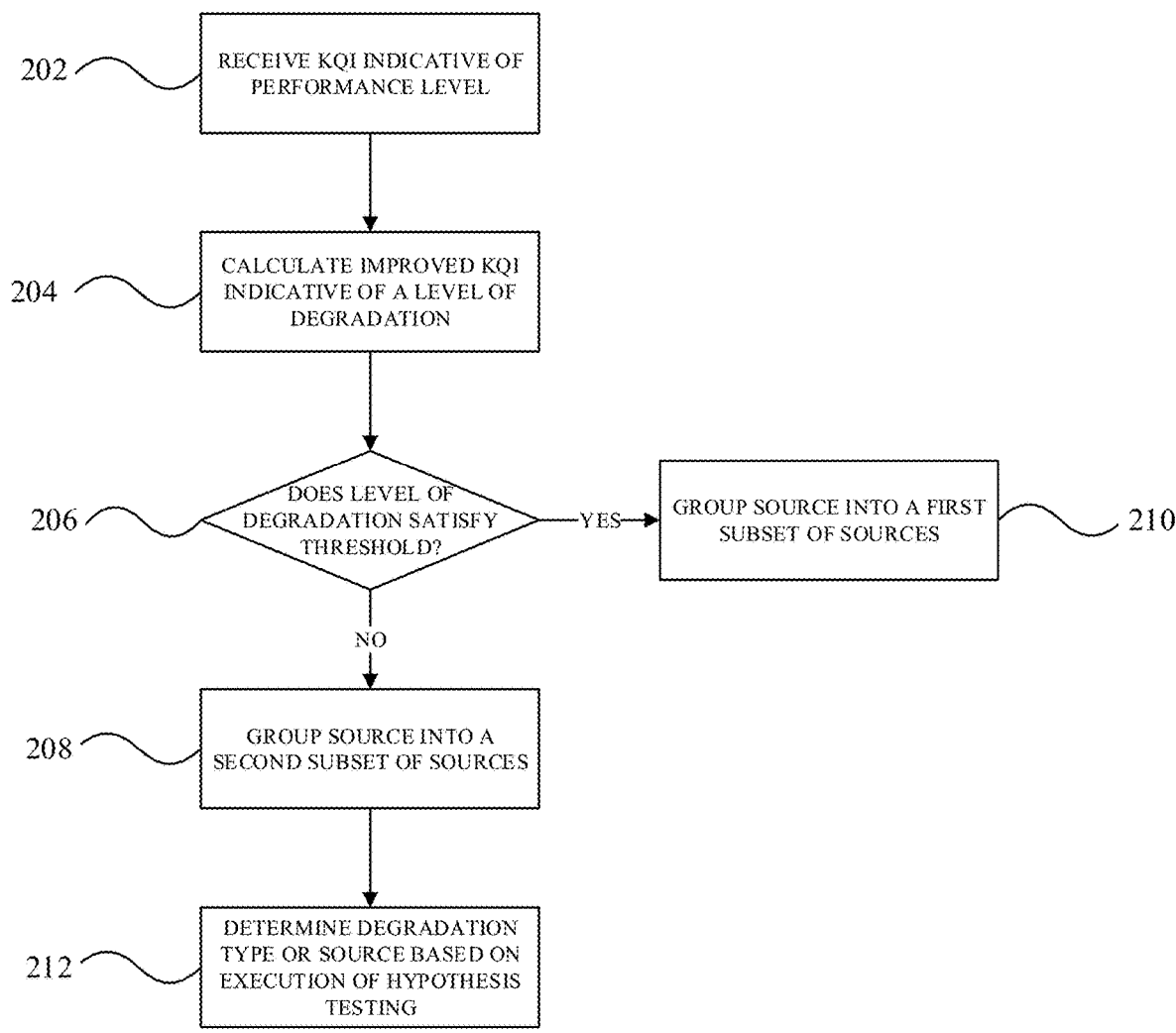
FIG. 2 illustrates a flow diagram of root cause analysis implemented in accordance with the system of FIG. 1.

FIG. 2 illustrates a flow diagram of root cause analysis implemented in accordance with the system of FIG. 1. In accordance with the embodiments that follow, the RNC 105 is responsible for managing the flow of information between network elements. However, it is appreciated that management of the flow of information is not limited to the RNC 105, and that any mechanisms known to the skilled artisan may be utilized.

When anomalous behavior is detected in the communications network (for example by RNC 105), it is important to determine which part of the network (for example, a server or RAN) is causing the anomaly, as well as determine the degradation type of the anomaly (for example, a partial or global degradation). At 202, the RNC 105 receives KQI data that includes information regarding the performance level of a particular source in the communication network 100. A source may be a cell (e.g., macro cells, femto cells, pico cell) that defines a geographic coverage area of the user equipment UE or a server (e.g., a content server that is part of the communication network 100) that is being accessed by the user equipment UE. These projections from the source level (e.g., cell or server level) to the RNC level may be calculated, for example, using the following equation:

$$KQI_{RNC} = \frac{\sum_{cell/server} \text{Weighted\_KQI}_{cell/server}}{\sum_{cell/server} \text{Usage\_Count}_{cell/server}}$$

in which the following, metrics may be used to calculate the KQI value:

Weighted_KQI =

$$\begin{cases} \text{Web\_Delay: HTTP\_Page\_Response\_Delay} \times \\ \quad \text{HTTP\_Page\_Response\_Success\_Count} \\ \text{Web\_Throughput: HTTP\_Page\_Large\_Display\_Rate} \times \\ \quad \text{HTTP\_Page\_Large\_Disp\_Duration} \times \\ \quad \text{HTTP\_Page\_Large\_Response\_Success\_Count} \\ \text{Video\_Init\_Duration: Video\_Init\_Duration} \times \\ \quad \text{Video\_uPlay\_Success\_Count} \\ \text{Video\_Throughput: Video\_uTraffic\_MBytes} \end{cases}$$

Usage_Count =

$$\begin{cases} \text{Web\_Delay: HTTP\_Page\_Response\_Success\_Count} \\ \text{Web\_Throughput: HTTP\_Page\_Large\_Disp\_Duration} \times \\ \quad \text{HTTP\_Page\_Large\_Response\_Sucess\_Count} \\ \text{Video\_Init\_Duration: Video\_uPlay\_Success\_Count} \\ \text{Video\_Throughput: Video\_uTraffic\_MBytes} / \\ \quad \text{Video\_Download\_Throughput\_kbps} \end{cases}$$

It is appreciated that the equation and metrics are non-limiting examples, and that other well-known techniques and other metrics may be employed.

At 204, an improved KQI is used to measure the anomalous effect (level of degradation) at each source that provides an improved performance metric (i.e., measurement of improvement) when the KQI value of a degraded source is recovered to a historical (baseline) value. The KQI improvement for an $i^{th}$ source is defined as:

$$S(i) = \frac{KQI^{recovery}_{SOURCE-RNC}(i) - KQI^{outlier}_{SOURCE-RNC}}{KQI^{history}_{SOURCE-RNC} - KQI^{outlier}_{SOURCE-RNC}}$$

A further discussion of the mechanism to arrive at the improved KQI is addressed below with reference to FIGS. 3 and 4.

Upon completion of calculating the improved KQI, the determined level of degradation at the source is compared against a threshold value (explained in detail below) at 206. If the determined level of degradation satisfies a threshold value, then the source is grouped into a first subset (cluster) of sources at 210. If, on the other hand, the determined level of degradation fails to satisfy the threshold value (i.e., the level of degradation is determined to be severe), then the source is grouped into a second subset (cluster) at 208. The threshold value, as explained further below, is an adaptively configured threshold value that is calculated using the techniques described herein with reference to a learned processing mechanism.

Following the grouping of sources into subsets, the RNC 105 then determines the degradation type of the source (for sources grouped into the second subset) based on execution of hypothesis testing at 212. Determination of the degradation type, as explained below, is based on hypothesis testing, and results in determining the source as one of a global degradation or a partial degradation. Moreover, the testing provides a confidence value that indicates the executed and accepted hypothesis testing has such a level of confidence.

Figure 3:
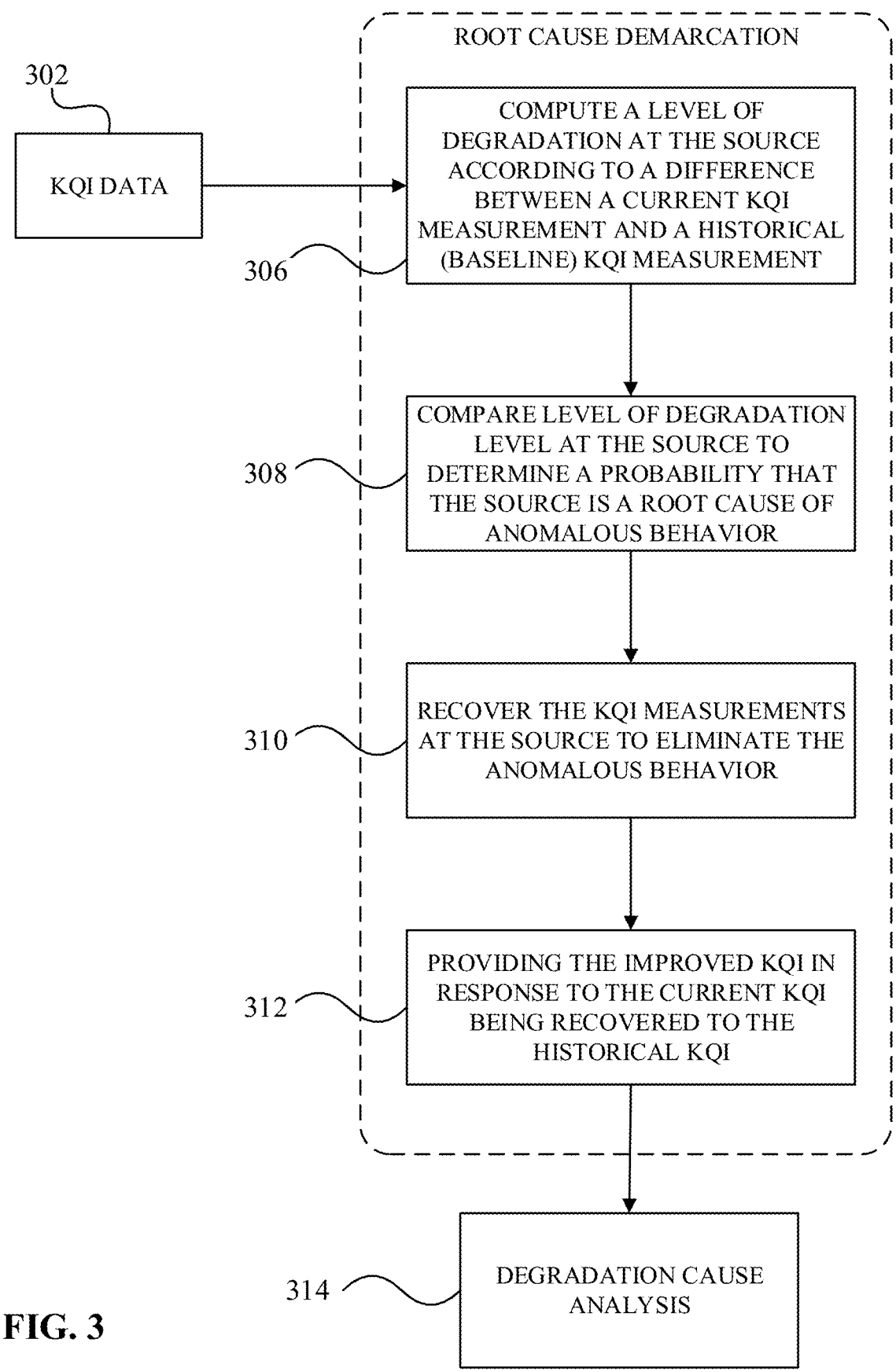
FIG. 3 illustrates a flow diagram illustrating the root cause demarcation at the radio network controller in accordance with FIGS. 1 and 2.

FIG. 3 is an example flowchart illustrating the root cause demarcation at the radio network controller in accordance with FIGS. 1 and 2. To determine the root cause demarcation at the RNC 105, the KQI data (302) is provided as an input source. At 306, the level of degradation at the source is computed according to the difference between the KQI at RNC 105 ($KQI_{RNC}$) at the time the anomalous behavior is detected (KQI outlier data) and the KQI at RNC 105 as determined by historical (baseline) data (KQI non-outlier data)), which data has been previously recorded. Additional details regarding the computation are discussed with reference to FIG. 4 below.

At 308, the RNC 105 calculates a probability that the anomalous behavior is a result of a specific source by comparing the level of degradation of the sources. For example, the RNC 105 will calculate a probability that a cell being used by user equipment UE is the root cause of the anomalous behavior. Similarly, the RNC 105 may calculate a probability that a server being used by the user equipment UE is the root cause of the anomalous behavior. Once calculated, the probabilities may be used by the RNC 105 to determine which source is the likely cause of the degradation. The comparisons may be formulated for each source (RAN and Server), as follows:

$$\begin{cases} RAN \text{ with prob. } \dfrac{Deg^{outlier}_{RAN-RNC}}{Deg^{outlier}_{RAN-RNC} + Deg^{outlier}_{Server-RNC}} \\ Server \text{ with prob. } \dfrac{Deg^{outlier}_{Server-RNC}}{Deg^{outlier}_{RAN-RNC} + Deg^{outlier}_{Server-RNC}} \end{cases}$$

Following the comparison of degradation levels to determine probabilities, the KQI measurements at the source are recovered to eliminate the anomalous behavior at 310. This may be implemented by application of the following formula, in which an anomalous effect of one source (e.g., RAN or server) is eliminated:

$$KQI^{recovery}_{RAN-RNC}(i) = \dfrac{\sum_{j \neq i} \text{Weighted\_KQI}^{outlier}_j + \dfrac{\sum_{days\,in\,history} \text{Weighted\_KQI}^{history}_i}{\# \text{ of days in history}}}{\sum_{j \neq i} \text{Usage\_Count}^{outlier}_j + \dfrac{\sum_{days\,in\,history} \text{Usage\_Count}^{history}_i}{\# \text{ of days in history}}}$$

where current KQI data of the $i^{th}$ source is reset to a KQI value from the historical (baseline) data. It is appreciated that although the source in the equation is a RAN, a similar equation may be used to calculate the KQI at another source, such as a server.

At 312, the improved KQI is then calculated in response to the current KQI being recovered to the historical (baseline) KQI using the equation detailed above (see, FIG. 2, 204). The result is then used as part of the degradation analysis at 314 (discussed below with reference to FIG. 5).

Figure 4:
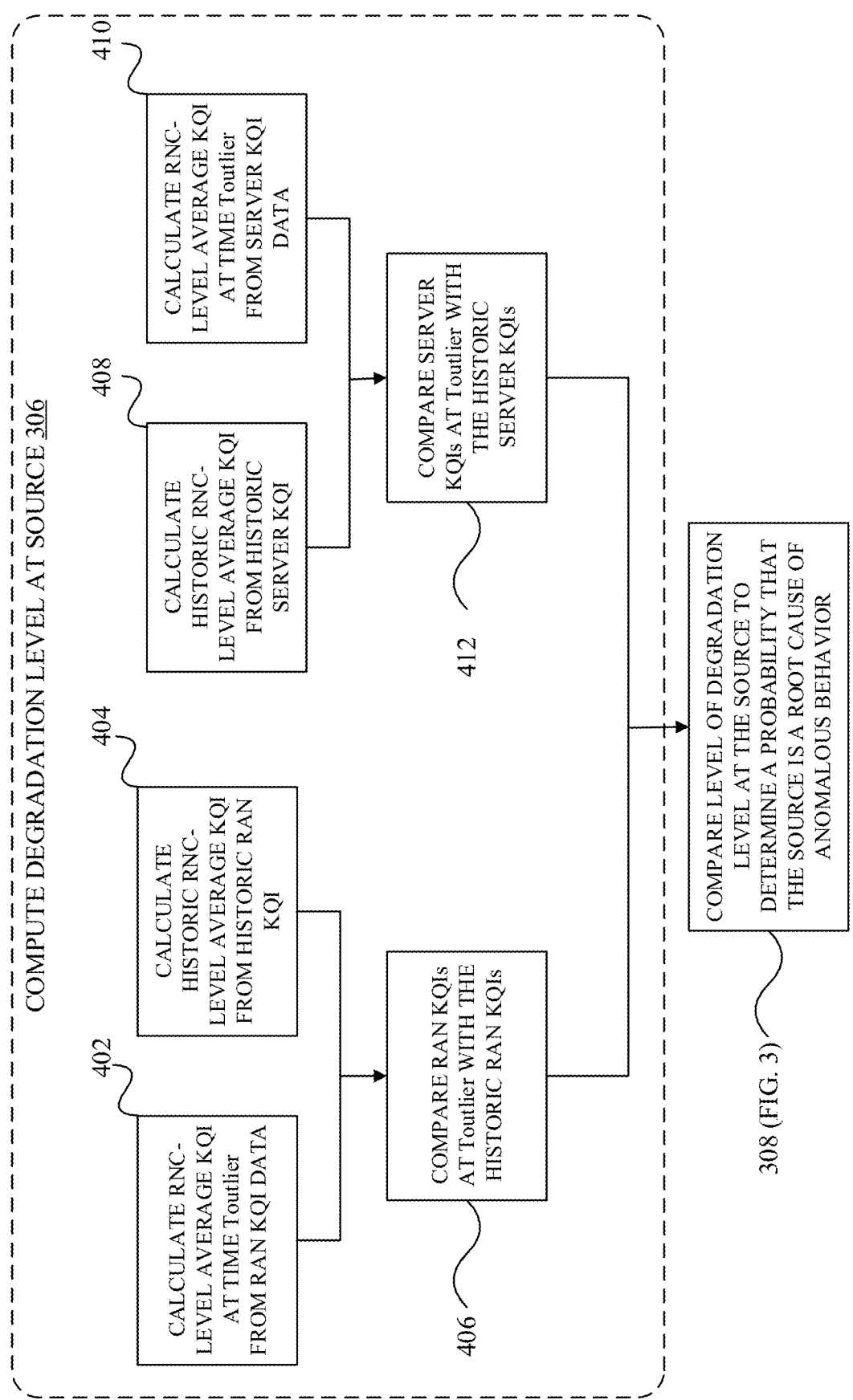
FIG. 4 illustrates a flow diagram of computing a degradation level in accordance with the diagram of FIG. 3.

FIG. 4 illustrates an embodiment of computing a degradation level in accordance with FIG. 3. For the RNC 105 to compute the level of degradation of a source, the difference between the $KQI_{RNC}$ at the time of the anomalous behavior (i.e., time of anomalous event) and the $KQI_{RNC}$ from historical (baseline) data is computed using the following equations:

| | RAN | Server |
|---|---|---|
| Outlier | $KQI^{outlier}_{RAN-RNC} = \dfrac{\sum_{cell} \text{Weighted\_KQI}^{outlier}_{cell}}{\sum_{cell} \text{Usage\_Count}^{outlier}_{cell}}$ | $KQI^{outlier}_{Server-RNC} = \dfrac{\sum_{server} \text{Weighted\_KQI}^{outlier}_{server}}{\sum_{server} \text{Usage\_Count}^{outlier}_{server}}$ |
| Non-Outlier | $KQI^{history}_{RAN-RNC} = \dfrac{\sum_{cell}\left(\dfrac{\sum_{days\,in\,history}\text{Weighted\_KQI}^{history}_{cell}}{\# \text{ of days in history}}\right)}{\sum_{cell}\left(\dfrac{\sum_{days\,in\,history}\text{Usage\_Count}^{history}_{cell}}{\# \text{ of days in history}}\right)}$ | $KQI^{history}_{Server-RNC} = \dfrac{\sum_{server}\left(\dfrac{\sum_{days\,in\,history}\text{Weighted\_KQI}^{history}_{server}}{\# \text{ of days in history}}\right)}{\sum_{server}\left(\dfrac{\sum_{days\,in\,history}\text{Usage\_Count}^{history}_{server}}{\# \text{ of days in history}}\right)}$ | where $Deg^{outlier}_{RAN-RNC} = \max\{(KQI^{outlier}_{RAN-RNC} - KQI^{history}_{RAN-RNC}), 0\}$ $Deg^{outlier}_{Server-RNC} = \max\{(KQI^{outlier}_{Server-RNC} - KQI^{history}_{Server-RNC}), 0\}$.

As indicated in the above table, the KQI is calculated for the source (e.g., RAN and server) for both a current KQI (KQI outlier) and a historical (baseline) KQI (KQI non-outlier). That is, the four equations are solved at 402, 404, 408 and 410. Once the equations have been solved and the comparisons made at 406 and 412, the data is output for a comparison of degradation level (as described with respect to 308 in FIG. 3).

Figure 5:
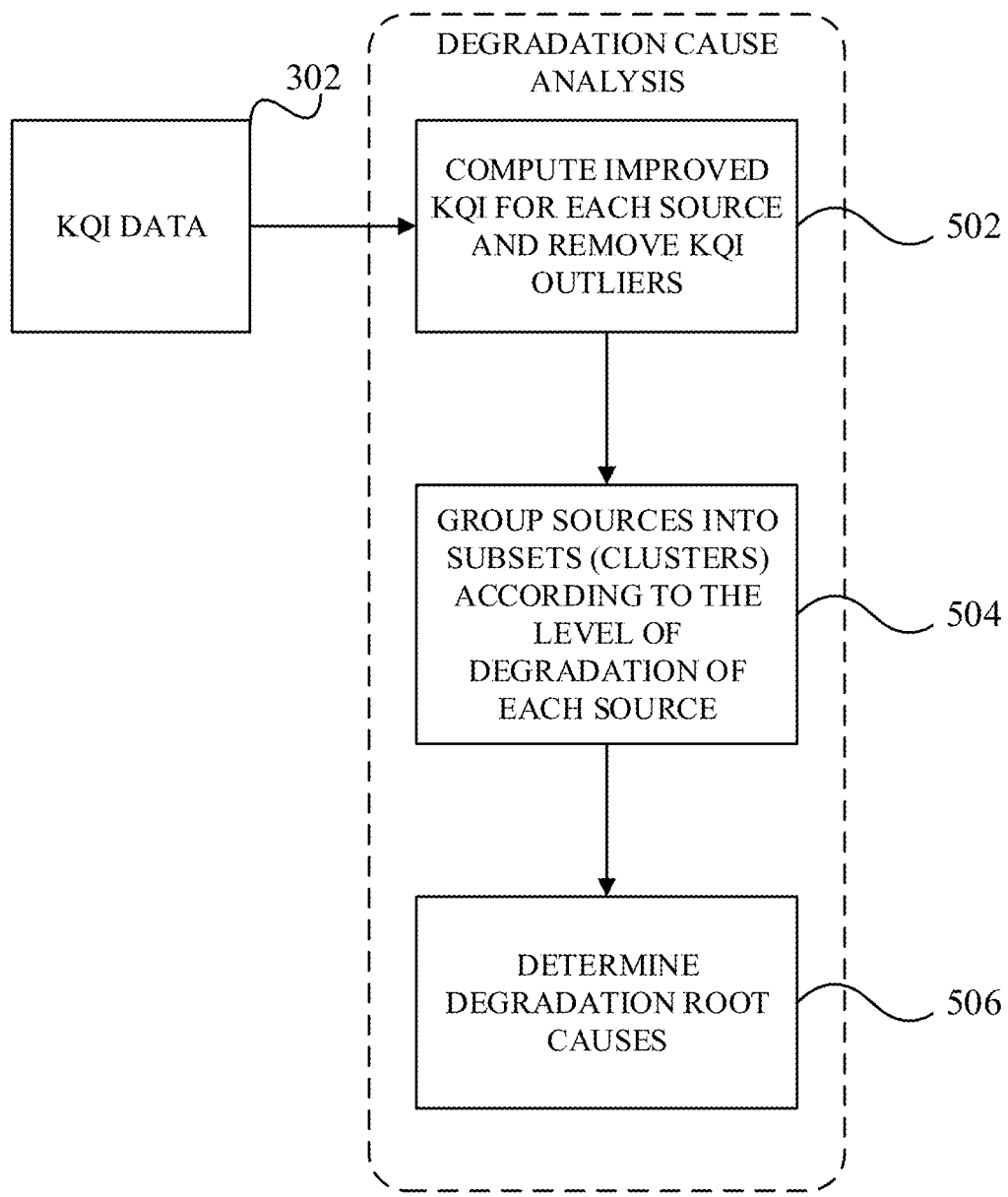
FIG. 5 illustrates a flow diagram for degradation cause analysis in accordance with FIG. 3.

FIG. 5 illustrates a flow diagram for degradation cause analysis in accordance with FIG. 3. At 502, anomalous behavior is determined at the source and the RNC 105 computes the improved KQI for each source. The KQI outliers are then removed, as explained above with reference to FIGS. 3 and 4. Accordingly, the process will not be repeated herein. Once the improved KQI computations have been performed, each of the sources is grouped into a subset (or cluster) of sources based on the level of degradation calculated at each source, at 504. Grouping of the sources is implemented by execution of a learned processing mechanism that, when solved, identifies the subset (cluster) of sources having severe degradation (i.e., severe KQI degradation as calculated as part of the processing discussed above with reference to FIGS. 2-4). That is, an improved KQI having a large value when a source is recovered to its baseline value is deemed to be severely degraded. Moreover, the learned processing mechanism may be constrained by boundaries, and may utilize an adaptive threshold value to perform processing. A detailed discussion of clustering sources and the learned processing mechanism may be found below with reference to FIG. 6.

At 506, the sources grouped into the subset having severe degradation are analyzed by the RNC 105 to determine the root cause of the anomalous behavior. The determination of degradation root causes is formulated as a hypothesis test to determine the degradation type (e.g., global degradation or partial degradation) at the source (e.g., RAN or Server), and subsequently solved using a Student's T-test or by use of decision rules having pre-defined historical data. Hypothesis testing is discussed in more detail below with reference to FIGS. 7 and 8.

Figure 6:
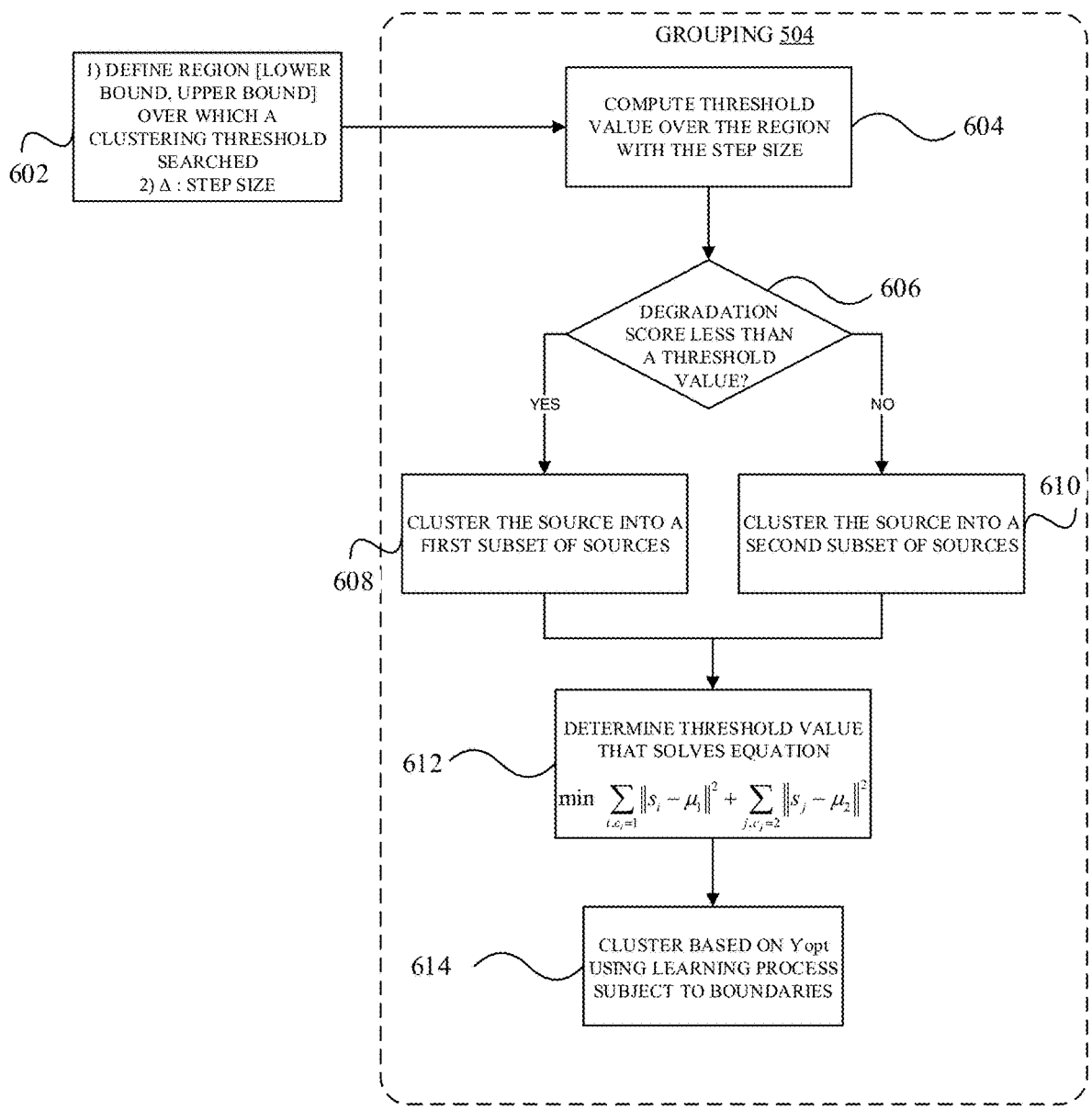
FIG. 6 illustrates a flow diagram of clustering sources using a learning process in accordance with FIG. 5.

FIG. 6 illustrates an example flow diagram of clustering sources using a learning process in accordance with FIG. 5. Grouping sources into subsets or clusters is performed by the RNC 105 to extract the sources having severe KQI degradation. Thus, to calculate improved KQI values for sources $\{s_i\}_{i=1,2,\ldots}$, the KQI data is grouped into two subsets (clusters), where the first subset of sources is defined as the sources with the "optimal" KQI data, and the second subset of sources is defined as the sources with degraded KQI data.

The data used for clustering is defined at 602, which includes the region (i.e., a lower bound (lb) and an upper bound (up)) defining constraints over which the clustering threshold is searched. That is, the lower bound and upper bound of the region define an area for which an optimal threshold value may be searched and located by the RNC 105. In addition to the region, $\Delta$ may be set to the step size. With the region and step size defined, the grouping process 504 may begin.

At 604, the RNC 105 computes a threshold value over the region having a $\Delta$ set to the step size. The threshold value is calculated according to the equation:

$$\Upsilon = lb + (i-1)\Delta, \ i=1,2,\ldots, \text{floor}((up-lb)/\Delta).$$

Once the threshold value $\Upsilon$ is computed, the RNC 105 determines whether the degradation score $S_i$ (previously calculated) is less than a threshold value at 606. The sources are grouped into one of first and second subsets (clusters) based on the degradation score $S_i$, where the source is grouped into a first subset (cluster 1) if $S_i < \gamma$ at 608, and the source is grouped into a second subset (cluster 2) if $S_i \geq \gamma$ at 610.

At 612, a threshold value $\Upsilon_{opt}$ (which is an optimal threshold value) is determined that solves the following optimization problem:

$$\min \sum_{i, c_i=1} \|s_i - \mu_1\|^2 + \sum_{j, c_j=2} \|s_j - \mu_2\|^2,$$

and at 614, the sources are grouped based on the optimal threshold value $\Upsilon_{opt}$ calculated as part of a learned processing mechanism that is subject to the afore-mentioned constraints. The learned processing mechanism is formulated as:

$$\min_{c, \mu} \sum_i \|s_i - \mu_{c_i}\|_2^2 \text{ subject to } S_j \geq \alpha, \text{ for } C_j = 2,$$

where $c_i \in \{1, 2\}$ is an index of one of the first and second subsets for which the $i^{th}$ source belongs, $\mu_j$ is a centroid of one of the $j^{th}$ first and second subsets, and $\alpha$ is a threshold indicative of a severity of the level of degradation.

Figure 7:
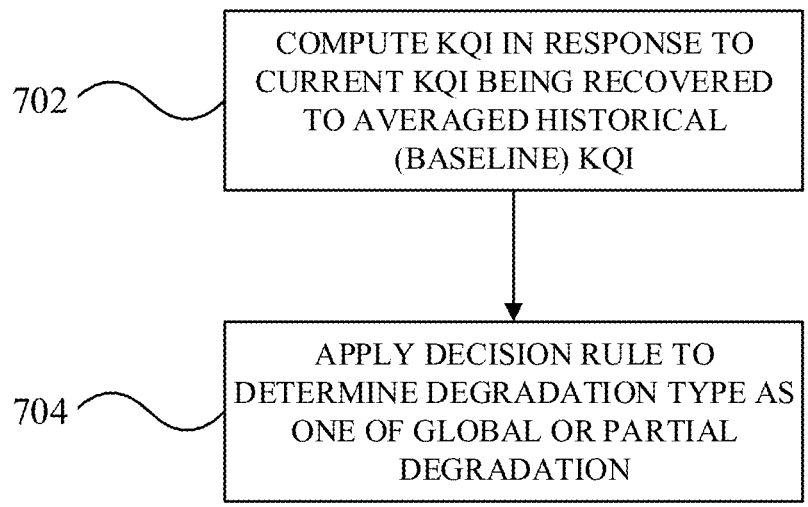
FIG. 7 illustrates a flow diagram of a hypothesis test for implementation in accordance with FIG. 2.

FIG. 7 illustrates a flow diagram of a hypothesis test for implementation in accordance with FIG. 2. The statistical hypothesis test in the disclosed embodiment is implemented to determine the degradation type (e.g., global or partial degradation) at the source, such as the RAN 101 or Server. At 702, the RNC 105 computes the KQI value at the RNC 105 when the KQI value of the second subset (cluster) of sources (the sources with severe degradation determined using the learned processing mechanism) is recovered to a KQI of the averaged historical (baseline) value. The metric employed to perform such a calculation is according to:

$$KQI_{RAN/Server-RNC}^{C_2-recovery} = \frac{\sum_{i \notin C_2} \text{Weighted\_KQI}_i^{outlier} + \sum_{i \in C_2} \text{Weighted\_KQI}_i^{history}}{\sum_{i \notin C_2} \text{Usage\_Count}_i^{outlier} + \sum_{i \in C_2} \text{Usage\_Count}_i^{history}},$$

where the source applied during calculation is one of the RAN and Server (e.g., RAN/Server), and the weighted KQI and usage count are determined in accordance with the procedures according to FIG. 2.

At 704, a decision rule is applied by the RNC 105 to determine the degradation type for the second subset of sources as one of global degradation and partial degradation. The decision rules may be formulated as:

$$\begin{cases} RAN/\text{Server} - \text{Partial} & \text{if } \dfrac{KQI_{RAN/Server-RNC}^{C_2-recovery} - KQI_{RAN/Server-RNC}^{outlier}}{KQI_{RAN/Server-RNC}^{history} - KQI_{RAN/Server-RNC}^{outlier}} > \beta, \\ RAN/\text{Server} - \text{Global} & \text{otherwise} \end{cases}$$

where $\beta$ is a threshold of indicating the partial degradation. In this embodiment, the threshold $\beta$ is calculated using a heuristic method, such as using pre-defined and historical data to calculate the threshold value. Moreover, in addition to providing the degradation type, the hypothesis test also provides a confidence level regarding the determined degradation type.

Figure 8:
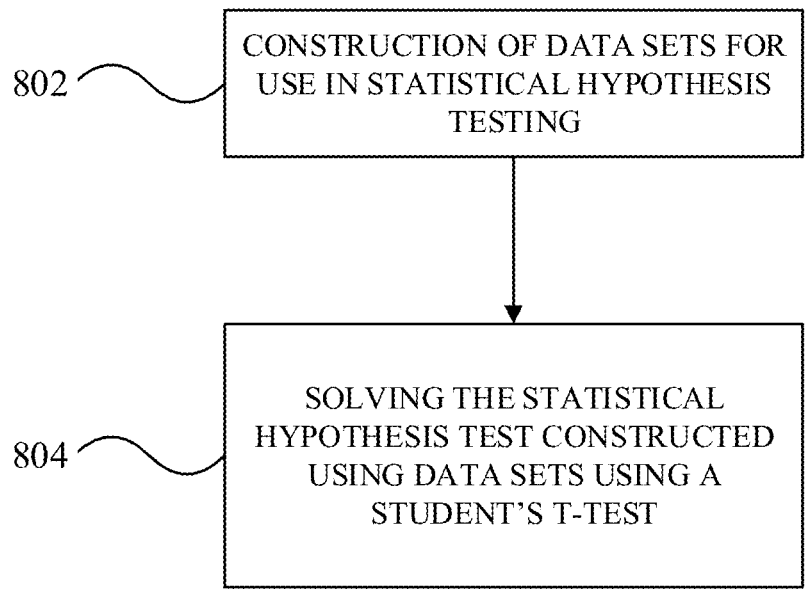
FIG. 8 illustrates another flow diagram of a hypothesis test for implementation in accordance with FIG. 2.

FIG. 8 is another flow diagram of a hypothesis test for implementation in accordance with FIG. 2. The statistical hypothesis test is another embodiment that may be implemented to determine the degradation type (e.g., global or partial degradation) at the source, such as the RAN 101 or Server. As opposed to the heuristic method applied in the hypothesis test above, this embodiment employs a Student's T-test for hypothesis testing.

At 802, the RNC 105 constructs data sets $\{x_i\}$ and $\{y_i\}$ for use in the hypothesis testing. The data sets are constructed according to the following formulas:

$$\{x_i\}: x_i = \begin{cases} \dfrac{\text{Weighted\_KQI}_i^{outlier}}{\sum\limits_{i \notin C_2} \text{Usage\_Count}_i^{outlier} + \sum\limits_{i \in C_2} \text{Usage\_Count}_i^{history}}, i \notin C_2 \\ \dfrac{\text{Weighted\_KQI}_i^{history}}{\sum\limits_{i \notin C_2} \text{Usage\_Count}_i^{outlier} + \sum\limits_{i \in C_2} \text{Usage\_Count}_i^{history}}, i \in C_2 \end{cases} ;$$

$$\{y_i\}: y_i \dfrac{\text{Weighted\_KQI}_i^{outlier}}{\sum\limits_{i} \text{Usage\_Count}_i^{outlier}}.$$

Once the data sets $\{x_i\}$ and $\{y_i\}$ have been constructed, a Student's T-test may be implemented for hypothesis testing to solve the formula:

$$\begin{cases} H_0: \bar{x} - \bar{y} < \varepsilon \\ H_1: \bar{x} - \bar{y} \geq \varepsilon \end{cases},$$

where $\bar{x}$ and $\bar{y}$ are defined as mean data sets $\{x_i\}$ and $\{y_i\}$ and $\varepsilon$ is the threshold value, where $H_0 < \varepsilon$ determines the degradation type to be a global degradation and $H_1 \geq \varepsilon$ determines the degradation type to be a partial degradation.

Although the embodiments described above relate to two hypothesis tests, it is appreciated that the embodiments are non-limiting. Any number of hypothesis tests may be employed to determine the degradation type.

Figure 9:
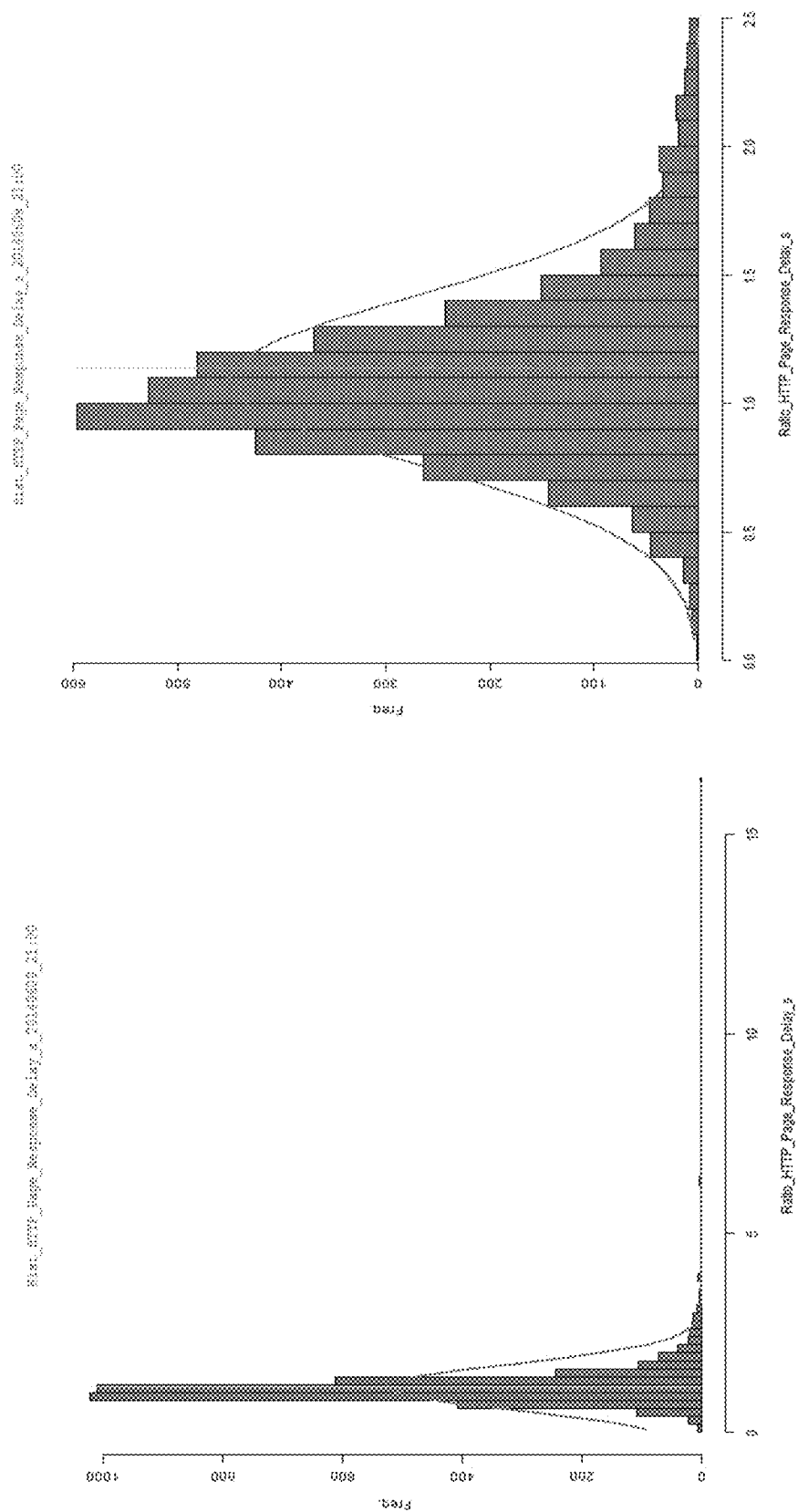
FIG. 9 illustrates a diagram illustrating results of the improved KQI computation at the source with recovered data.

FIG. 9 illustrates a diagram illustrating results of the improved KQI computation at the source with recovered data. As illustrated, the graph on the left illustrates a processed data set in accordance with the procedures detailed in FIGS. 3 and 4 (306), and the graph on the right illustrates the data set that has been recovered by eliminating the anomalous behavior at the source in accordance with the procedures of FIG. 3 (310).

Figure 10:
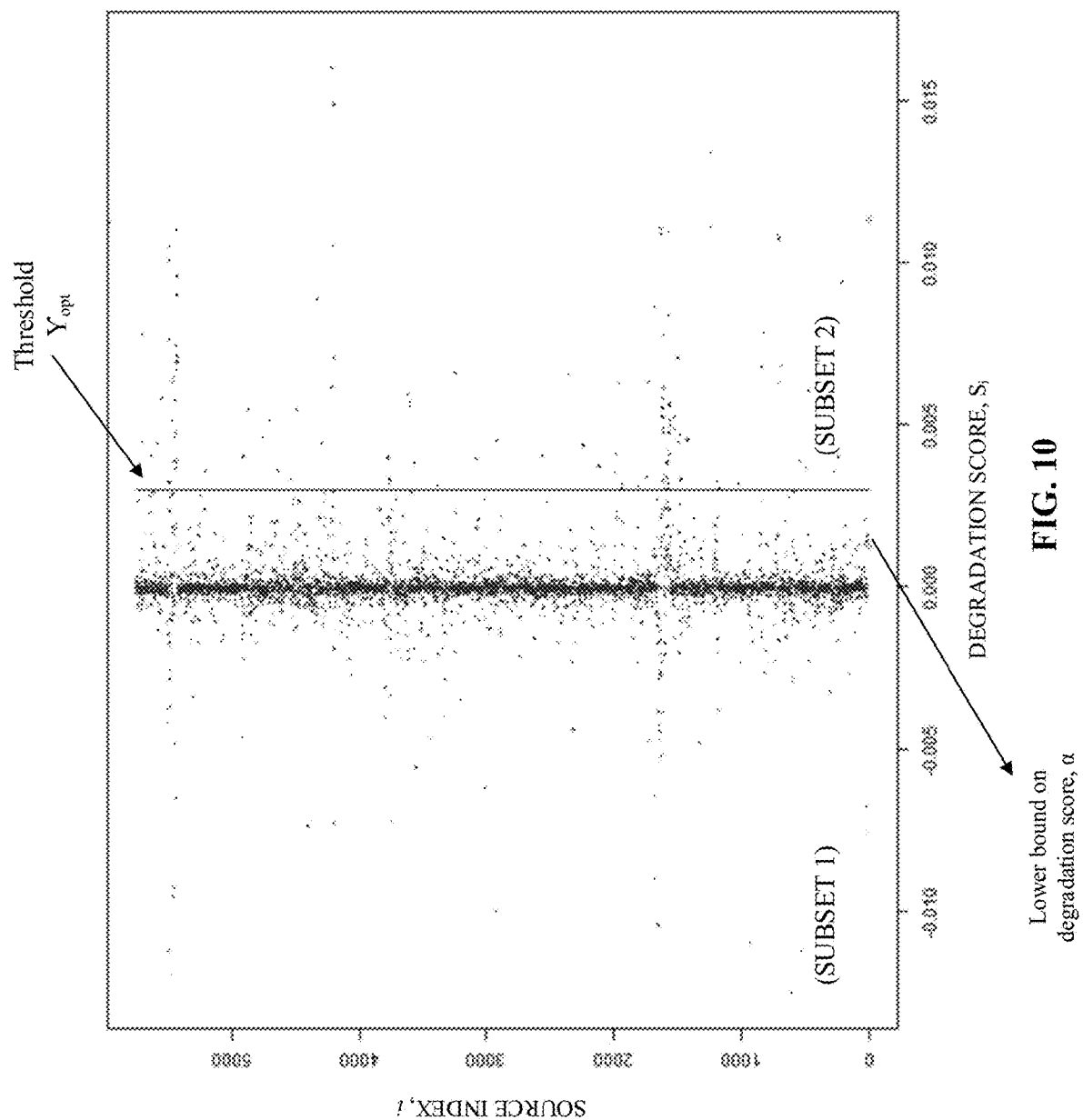
FIG. 10 illustrates a diagram of clustering results as determined from the flow diagram in FIG. 6.

FIG. 10 illustrates a diagram of clustering results as determined from the flow diagram in FIG. 6. As depicted in the figure, a root cause analysis is displayed for a dataset in which the degradation score $s_i$ of each source (in this example, each server) is plotted along the x-axis, and the source index ($i^{th}$ source) is plotted along the y-axis. A threshold $\Upsilon_{opt}$ "divides" the sources into a first subset (subset 1) in which the degradation level of each source satisfies the threshold $\Upsilon_{opt}$, and a second subset (subset 2) in which the degradation level of each source fails to satisfy the threshold $\Upsilon_{opt}$. That is, the second subset illustrates outlier sources for which the level of degradation at the server is severe based on the improved KQI calculations.

In the embodiment, the RNC 105 is applying a response delay metric for the KQI, for example, at a specified time period. When calculating the RN demarcation values at the sources (e.g., RAN and Sever), for example, according to the procedures outlined in FIG. 3 (308), the RNC 105 calculates the probabilities as, for the provided data set (now shown):

|  | Probability of RNC Demarcation |
| --- | --- |
| RAN | 0.151748 |
| Server | 0.848252 | where the higher probability value at the server indicates that the server degradation is the root cause of the anomalous behavior. Degradation analysis, as performed according to FIG. 5, results in the clustering of first and second subsets as depicted in the figure.

Following the clustering results, hypothesis testing is performed (in this example using a Student's T-test) which returns the following results:

|  | Server |
| --- | --- |
| Degradation Type | Partial |
| Percentage of second subset | 2.45% |
| KQI Improvement | 154.68% |
| P-value | 0.265895 |

Based on these results, the acceptance of the $H_1$ hypothesis test (FIG. 8, partial degradation) has a confidence level (p-value) of 73.4%.

Figure 11:
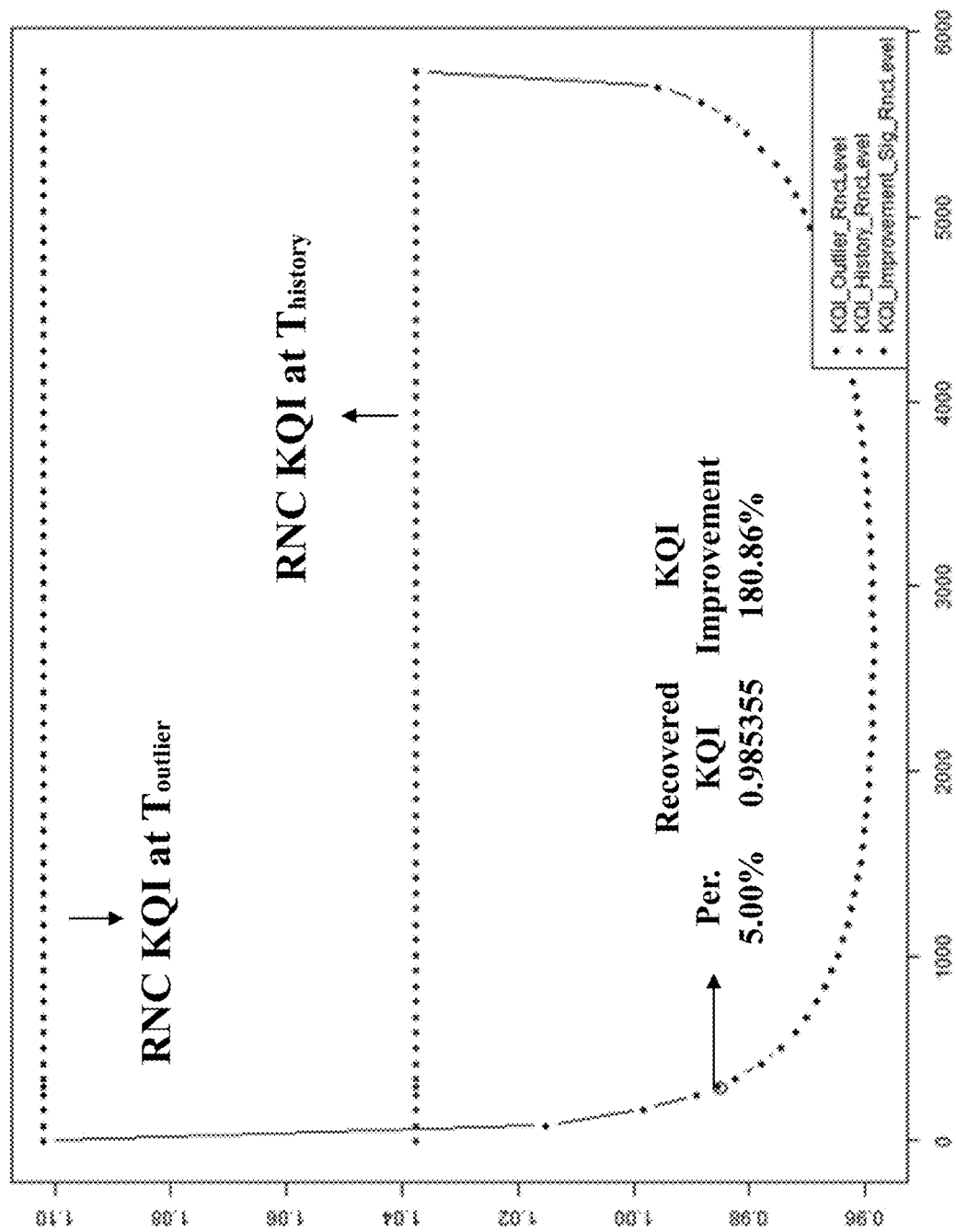
FIG. 11 illustrates a diagram of recovered KQI data in accordance with FIG. 10.

FIG. 11 illustrates a diagram of recovered KQI data in accordance with FIG. 10. As depicted, the diagram plots the KQI data with severe degradation (KQI outlier data), KQI historical (baseline) data and the recovered KQI data (when the KQI outlier data is recovered to the KQI historical data). As illustrated, the number of sources (in this example, servers) recovered along the x-axis and the KQI data metrics (response delay) along the y-axis. Thus, for the recovered KQI data, the KQI improvement calculation (as determined in FIGS. 3 and 5) shows an improvement of 180.86%.

Figure 12:
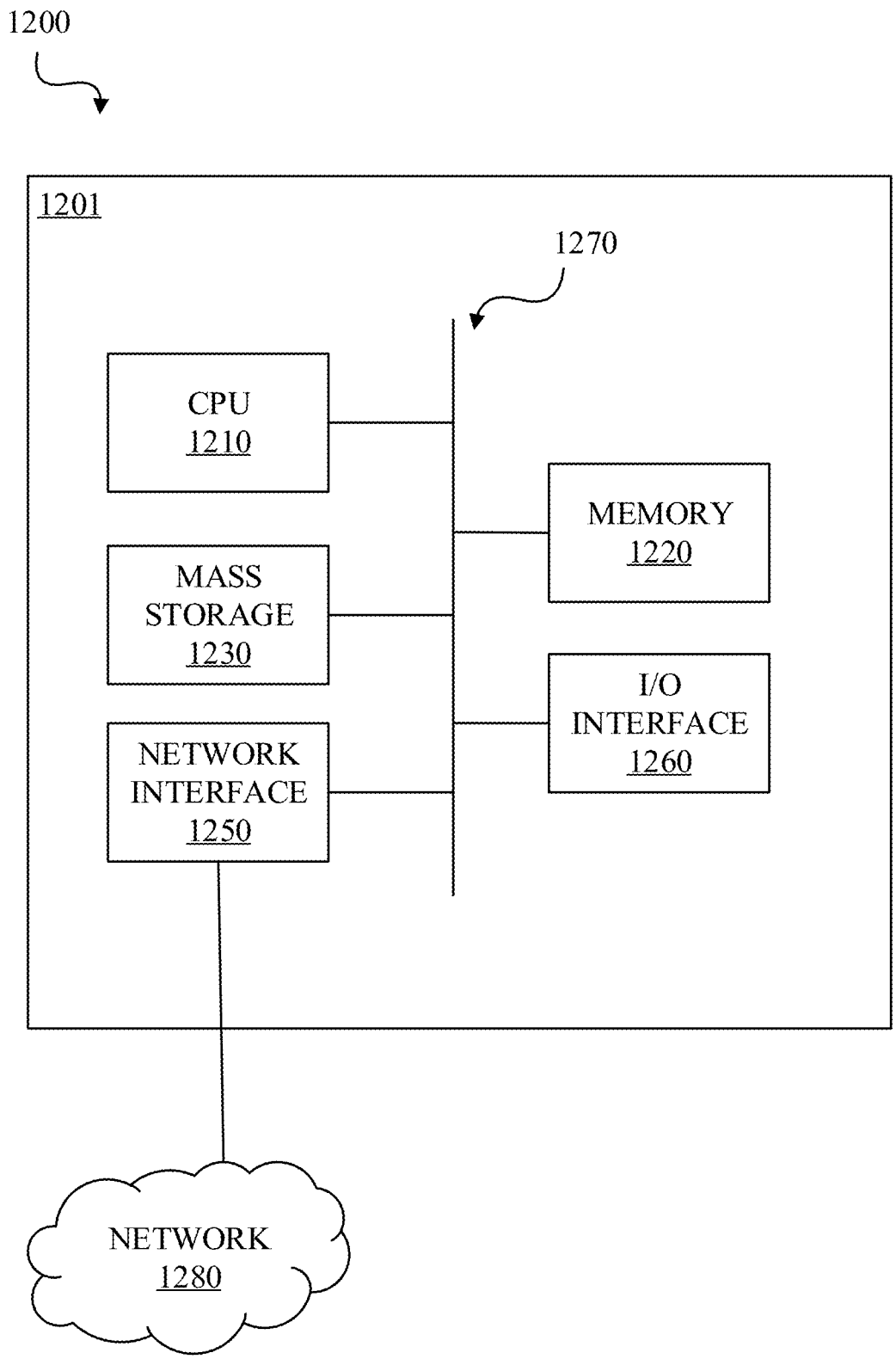
FIG. 12 illustrates a block diagram of a network system that can be used to implement various embodiments.

FIG. 12 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1201 equipped with one or more input/output devices, such as network interfaces, storage interfaces, and the like. The processing unit 1201 may include a central processing unit (CPU) 1210, a memory 1220, a mass storage device 1230, and an I/O interface 1260 connected to a bus. The bus may be one or more of any type of several bus architectures including a memory bus or memory controller, a peripheral bus or the like.

The CPU 1210 may comprise any type of electronic data processor. The memory 1220 may comprise any type of system memory such as static random access memory (SRAM), dynamic random access memory (DRAM), synchronous DRAM (SDRAM), read-only memory (ROM), a combination thereof, or the like. In an embodiment, the memory 1220 may include ROM for use at boot-up, and DRAM for program and data storage for use while executing programs. In embodiments, the memory 1220 is non-transitory. The mass storage device 1230 may comprise any type of storage device configured to store data, programs, and other information and to make the data, programs, and other information accessible via the bus. The mass storage device 1230 may comprise, for example, one or more of a solid state drive, hard disk drive, a magnetic disk drive, an optical disk drive, or the like.

The processing unit 1201 also includes one or more network interfaces 1250, which may comprise wired links, such as an Ethernet cable or the like, and/or wireless links to access nodes or one or more networks 1280. The network interface 1250 allows the processing unit 1201 to communicate with remote units via the networks 1280. For example, the network interface 1250 may provide wireless communication via one or more transmitters/transmit antennas and one or more receivers/receive antennas. In an embodiment, the processing unit 1201 is coupled to a local-area network or a wide-area network for data processing and communications with remote devices, such as other processing units, the Internet, remote storage facilities, or the like.

As a result of the anomalous behavior detection discussed above, several advantages are provided. The proposed learning process mechanism provides not only RNC anomaly root causes but also confidence levels for these causes. Moreover, the effect of traffic variation on KQI anomaly root cause analysis is covered, and the learned process mechanism is computationally simple, easy to implement, requires little memory and can admit to real-time operation.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium storing computer instructions for identifying a root cause of anomalous behavior in a communications network, that when executed by one or more processors, perform the steps of:

receiving and storing a key quality indicator (KQI) indicative of a performance level associated with a source in the communication network, the KQI including a performance measurement value identifying the performance level of the source having the anomalous behavior;

calculating an improved KQI indicative of a level of degradation resulting from the anomalous behavior at the source by recovering a current performance measurement value at the source to a baseline performance measurement value at the source;

grouping the source into at least one of a first subset of sources and a second subset of sources according to the level of degradation at the source based on the calculated improved KQI; and determining a degradation type for the source grouped in the second subset based on execution of a statistical hypothesis test and computing a confidence value indicative of a confidence level in accepting the determined degradation type as a result of the statistical hypothesis test.

2. The non-transitory computer-readable medium of claim 1, wherein the instructions for calculating the improved KQI further comprises computer instructions for:

measuring a resultant value of the anomalous behavior at the source; and providing the improved KQI in response to the current performance measurement value of the source having the level of degradation satisfying a threshold value being recovered to the baseline performance measurement value.

3. The non-transitory computer-readable medium of claim 1 further comprises computer instructions for:

computing the level of degradation at the source according to a difference between the current performance measurement value of the KQI when the anomalous behavior is detected and the baseline performance measurement value of the KQI based on a statistical performance measurement value;

comparing the computed level of degradation at the source to determine a probability identifying that the source as being the root cause of the detected anomalous behavior; and recovering the KQI at the source to remove the detected anomalous behavior by restoring the current performance measurement value of the KQI to the baseline performance measurement value of the KQI.

4. The non-transitory computer-readable medium of claim 3, wherein the improved KQI of the $i^{th}$ source is calculated according to $$S(i) = \frac{KQI_{SOURCE-RNC}^{recovery}(i) - KQI_{SOURCE-RNC}^{outlier}}{KQI_{SOURCE-RNC}^{history} - KQI_{SOURCE-RNC}^{outlier}},$$

where RAN is a Radio Access Network and RNC is a Radio Network Controller.

5. The non-transitory computer-readable medium of claim 1, the grouping further comprising computer instructions for:
   clustering the first subset of sources in response to identifying the improved KQI as satisfying a threshold value; and
   clustering the second subset of sources in response to identifying the improved KQI as failing to satisfy the threshold value.

6. The non-transitory computer-readable medium of claim 5, wherein the clustering is determined according to a learning process executed according to $$\min_{c,\mu} \sum_i \|s_i - \mu_{c_i}\|_2^2 \text{ subject to } S_j \geq \alpha, \text{ for } C_j = 2,$$

where $c_i \in \{1,2\}$ is an index of one of the first and second subsets for which the $i^{th}$ source belongs, $\mu_j$ is a centroid of one of the $j^{th}$ first and second subsets, and $\alpha$ is a threshold indicative of a severity of the level of degradation.

7. The non-transitory computer-readable medium of claim 5, wherein the clustering further comprises computer instructions for:
   computing the threshold value over a region defining a lower bound (lb) and an upper bound (up) with a step size ($\Delta$), wherein the threshold value is determined by $\Upsilon = \text{lb} + (i-1)\Delta, i=1,2, \ldots, \text{floor}((\text{up-lb})/\Delta);$ clustering the source into the first subset of sources in response to a degradation score of the source being less than the threshold value and clustering the source into the second subset in response to the degradation score of the source being greater than or equal to the threshold value; and
   determining the threshold value that solves $$\min \sum_{i,c_i=1} \|s_i - \mu_1\|^2 + \sum_{j,c_j=2} \|s_j - \mu_2\|^2.$$

8. The non-transitory computer-readable medium of claim 1, wherein the execution of the statistical hypothesis test comprises computer instructions for:
   constructing data sets for use in the statistical hypothesis test; and
   solving the statistical hypothesis test constructed using the data sets using a Student's T-test, where the hypothesis test is formulated to determine the degradation type at the source as one of a global degradation and a partial degradation.

9. The non-transitory computer-readable medium of claim 8, wherein the hypothesis test is formulated according to $$\begin{cases} H_0: \bar{x} - \bar{y} < \varepsilon \\ H_1: \bar{x} - \bar{y} \geq \varepsilon \end{cases},$$

where $\bar{x}$ and $\bar{y}$ are defined as mean data sets $\{x_i\}$ and $\{y_i\}$ and $\varepsilon$ is a threshold value.

10. The non-transitory computer-readable medium of claim 1, wherein execution of the statistical hypothesis test comprises computer instructions for:
    computing the KQI in response to the current performance measurement value at the source of the second subset of sources being recovered to an averaged baseline performance measurement value; and
    applying a decision rule to determine the degradation type for the second subset of sources as one of global degradation and partial degradation.

11. The non-transitory computer-readable medium of claim 1, wherein the source is one of a Radio Access Network (RAN), a Server and servers in a cloud computing system.

12. An apparatus for identifying a root cause of anomalous behavior in a communications network, comprising:
    a receiver receiving a key quality indicator (KQI) indicative of a performance level associated with a source in the communication network, the KQI including a performance measurement value identifying the performance level of the source having the anomalous behavior; and
    a processor configured to
       calculate an improved KQI indicative of a level of degradation resulting from the anomalous behavior at the source by recovering a current performance measurement value at the source to a baseline performance measurement value at the source;
       group the source into at least one of a first subset of sources and a second subset of sources according to the level of degradation at the source based on the calculated improved KQI; and
       determine a degradation type for the source grouped in the second subset based on execution of a statistical hypothesis test and compute a confidence value indicative of a confidence level in accepting the determined degradation type as a result of the statistical hypothesis test.

13. The apparatus of claim 12, wherein the processor is further configured to:
    measure a resultant value of the anomalous behavior at the source; and
    provide the improved KQI in response to the current performance measurement value of the source having the level of degradation satisfying a threshold value being recovered to the baseline performance measurement value.

14. The apparatus of claim 12, wherein the receiver is further configured to:
    compute the level of degradation at the source according to a difference between the current performance measurement value of the KQI when the anomalous behavior is detected and the baseline performance measurement value of the KQI based on a statistical performance measurement value;

compare the computed level of degradation at the source to determine a probability identifying that the source as being the root cause of the detected anomalous behavior; and recover the KQI at the source to remove the detected anomalous behavior by restoring the current performance measurement value of the KQI to the baseline performance measurement value of the KQI.

15. The apparatus of claim 14, wherein the improved KQI of the $i^{th}$ source is calculated according to $$S(i) = \frac{KQI_{RAN-RNC}^{recovery}(i) - KQI_{RAN-RNC}^{outlier}}{KQI_{RAN-RNC}^{history} - KQI_{RAN-RNC}^{outlier}},$$

where RAN is a Radio Access Network and RNC is a Radio Network Controller.

16. The apparatus of claim 12, wherein the processor is further configured to:
cluster the first subset of sources in response to identifying the improved KQI as satisfying a threshold value; and
cluster the second subset of sources in response to identifying the improved KQI as failing to satisfy the threshold value.

17. The apparatus of claim 16, wherein the processor is configured to cluster the source into the first and second subsets according to a learning process executed as $$\min_{c,\mu} \sum_i \|s_i - \mu_{c_i}\|_2^2 \text{ subject to } S_j \geq \alpha, \text{ for } C_j = 2,$$

where $c_i \in \{1,2\}$ is an index of one of the first and second subsets for which the $i^{th}$ source belongs, $\mu_j$ is a centroid of one of the $j^{th}$ first and second subsets, and $\alpha$ is a threshold indicative of a severity of the level of degradation.

18. The apparatus of claim 16, wherein the processor is further configured to:
compute the threshold value over a region defining a lower bound (lb) and an upper bound (up) with a step size ($\Delta$), wherein the threshold value is determined by $\Upsilon = \text{lb} + (i-1)\Delta, i=1,2, \ldots, \text{floor}((\text{up}-\text{lb})/\Delta);$ cluster the source into the first subset of sources in response to a degradation score of the source being less than the threshold value and cluster the source into the second subset in response to the degradation score of the source being greater than or equal to the threshold value; and
determine the threshold value that solves $$\min \sum_{i,c_i=1} \|s_i - \mu_1\|^2 + \sum_{j,c_j=2} \|s_j - \mu_2\|^2.$$

19. The apparatus of claim 12, wherein the processor is further configured to execute the statistical hypothesis test by:
constructing data sets for use in the statistical hypothesis test; and
solving the statistical hypothesis test constructed using the data sets using a Student's T-test, where the hypothesis test is formulated to determine the degradation type at the source as one of a global degradation and a partial degradation.

20. The apparatus of claim 19, wherein the hypothesis test is formulated according to $$\begin{cases} H_0: \bar{x} - \bar{y} < \varepsilon \\ H_1: \bar{x} - \bar{y} \geq \varepsilon \end{cases},$$

where $\bar{x}$ and $\bar{y}$ are defined as mean data sets $\{x_i\}$ and $\{y_i\}$ and $\varepsilon$ is a threshold value.

21. The apparatus of claim 12, wherein the processor is configured to execute the statistical hypothesis test by:
computing the KQI in response to the current performance measurement value at the source of the second subset of sources being recovered to an averaged baseline performance measurement value; and
applying a decision rule to determine the degradation type for the second subset of sources as one of global degradation and partial degradation.

22. The apparatus of claim 12, wherein the source is one of a Radio Access Network (RAN) and a Server.

23. A method for identifying a root cause of anomalous behavior in a communications network, the method comprising:
receiving a key quality indicator (KQI) indicative of a performance level associated with a source in the communication network, the KQI including a performance measurement value identifying the performance level of the source having the anomalous behavior;
calculating an improved KQI indicative of a level of degradation resulting from the anomalous behavior at the source by recovering a current performance measurement value at the source to a baseline performance measurement value at the source;
grouping the source into at least one of a first subset of sources and a second subset of sources according to the level of degradation at the source based on the calculated improved KQI; and
determining a degradation type for the source grouped in the second subset based on execution of a statistical hypothesis test and computing a confidence value indicative of a confidence level in accepting the determined degradation type as a result of the statistical hypothesis test.

24. The method of claim 23 further comprises:
computing the level of degradation at the source according to a difference between the current performance measurement value of the KQI when the anomalous behavior is detected and the baseline performance measurement value of the KQI based on a statistical performance measurement value;
comparing the computed level of degradation at the source to determine a probability identifying that the source as being the root cause of the detected anomalous behavior; and
recovering the KQI at the source to remove the detected anomalous behavior by restoring the current performance measurement value of the KQI to the baseline performance measurement value of the KQI.

25. The method of claim 24, wherein the improved KQI of the $i^{th}$ source is calculated according to $$S(i) = \frac{KQI^{recovery}_{SOURCE-RNC}(i) - KQI^{outlier}_{SOURCE-RNC}}{KQI^{history}_{SOURCE-RNC} - KQI^{outlier}_{SOURCE-RNC}},$$

where RAN is a Radio Access Network and RNC is a Radio Network Controller.

* * * * *